(12) United States Patent
Michioka et al.

(10) Patent No.: US 8,408,087 B2
(45) Date of Patent: Apr. 2, 2013

(54) SCREW DEVICE WITH SOUND INSULATING MEMBER

(75) Inventors: Hidekazu Michioka, Tokyo (JP); Hiroshi Niwa, Tokyo (JP); Katsuya Iida, Tokyo (JP); Yoshiaki Saitoh, Tokyo (JP)

(73) Assignee: THK Co., Ltd., Tokyo (JP)

( * ) Notice: Subject to any disclaimer, the term of this patent is extended or adjusted under 35 U.S.C. 154(b) by 774 days.

(21) Appl. No.: 11/718,198

(22) PCT Filed: Oct. 27, 2005

(86) PCT No.: PCT/JP2005/019769
§ 371 (c)(1),
(2), (4) Date: Aug. 21, 2008

(87) PCT Pub. No.: WO2006/046636
PCT Pub. Date: May 4, 2006

(65) Prior Publication Data
US 2009/0249911 A1     Oct. 8, 2009

(30) Foreign Application Priority Data
Oct. 29, 2004   (JP) ................. 2004-316586

(51) Int. Cl.
*F16H 1/24* (2006.01)

(52) U.S. Cl. .................................... 74/424.87

(58) Field of Classification Search ............ 74/89.23, 74/89.4, 424.81, 424.86, 424.87, 424.82, 74/89.41, 89.44
See application file for complete search history.

(56) References Cited

U.S. PATENT DOCUMENTS
4,053,167 A * 10/1977 Jelinek ................. 277/354
4,557,156 A * 12/1985 Teramachi ............. 74/424.86
(Continued)

FOREIGN PATENT DOCUMENTS
JP         60-8557 U        1/1985
JP       62043443 A    *   2/1987
(Continued)

OTHER PUBLICATIONS
International Search Report of PCT/JP2005/019769, date of mailing Jan. 24, 2006.
(Continued)

*Primary Examiner* — Thomas R Hannon
*Assistant Examiner* — Alan Waits
(74) *Attorney, Agent, or Firm* — Westerman, Hattori, Daniels & Adrian, LLP (57) ABSTRACT

The present invention provides a screw device enabling insulation of sounds occurring from the inside of the screw device when circulating rolling elements.

The screw device includes: a screw shaft 1 having a spiral rolling-element rolling groove 1a on an outer circumferential surface; a nut body 2 having a spiral loaded rolling-element rolling groove 2a on an inner circumferential surface to oppose the rolling-element rolling groove 1a of the screw shaft 1 and having therein a rolling-element returning passage 6 to return rolling elements 3 rolling in a loaded rolling-element rolling passage 10 formed between the loaded rolling-element rolling groove 2a and the rolling-element rolling groove 1a of the screw shaft 1; a circulation member 9 attached to an end face of the nut body 2 and provided with a direction changing passage 5 to connect the loaded rolling-element rolling passage 10 and the rolling-element returning passage 6; and a sound insulating member 11 attached to the nut body 2 to which the circulation member 9 is attached and formed to have an inner circumferential surface coming into contact with the screw shaft and to cover the circulation member 9.

6 Claims, 9 Drawing Sheets

U.S. PATENT DOCUMENTS

| | | | |
|---|---|---|---|
| 4,795,172 A | | 1/1989 | Brande |
| 4,841,796 A | * | 6/1989 | Teramachi ................. 74/424.86 |
| 4,864,883 A | * | 9/1989 | Mayfield ..................... 74/424.87 |
| 5,029,877 A | * | 7/1991 | Fedeli ............................ 277/354 |
| 5,492,036 A | | 2/1996 | Sato |
| 5,906,136 A | | 5/1999 | Yabe et al. |
| 5,988,007 A | * | 11/1999 | Nishimura ................. 74/424.87 |
| 6,178,839 B1 | * | 1/2001 | Yoshida et al. ............ 74/424.87 |
| 6,199,440 B1 | * | 3/2001 | Greubel et al. ............. 74/89.23 |
| 6,220,110 B1 | * | 4/2001 | Yang et al. ................. 74/424.87 |
| 6,634,246 B2 | * | 10/2003 | Ohya et al. .................... 74/89.44 |
| 6,675,669 B2 | * | 1/2004 | Sekiya et al. ............. 74/424.87 |
| 6,708,577 B2 | * | 3/2004 | Pizzoni et al. ............... 74/89.36 |
| 6,794,015 B2 | * | 9/2004 | Kasuga et al. ................ 428/172 |
| 6,854,351 B2 | * | 2/2005 | Yabe et al. ................. 74/424.82 |
| 6,898,814 B2 | * | 5/2005 | Kawamura et al. ............ 5/655.9 |
| 6,931,955 B2 | * | 8/2005 | Yatsushiro et al. ............ 74/89.4 |
| 7,188,542 B2 | * | 3/2007 | Yabe et al. ................. 74/424.82 |
| 7,350,434 B2 | * | 4/2008 | Nishimura et al. ........ 74/424.86 |
| 7,430,933 B2 | * | 10/2008 | Yatsushiro et al. ............ 74/89.4 |
| 7,500,409 B2 | * | 3/2009 | Yatsushiro et al. ............ 74/89.4 |
| 7,870,806 B2 | * | 1/2011 | Nishimura et al. ........ 74/424.82 |
| 2001/0010176 A1 | * | 8/2001 | Tsukada et al. ............. 74/89.44 |
| 2002/0023512 A1 | * | 2/2002 | Tsukada et al. ............ 74/424.81 |
| 2004/0188552 A1 | | 9/2004 | Saito et al. |
| 2004/0211280 A1 | * | 10/2004 | Nishimura et al. ........ 74/424.82 |
| 2005/0087029 A1 | * | 4/2005 | Perni et al. ..................... 74/89.4 |
| 2005/0255927 A1 | | 11/2005 | Michioka et al. |
| 2006/0060014 A1 | * | 3/2006 | Namgung ................... 74/89.23 |

FOREIGN PATENT DOCUMENTS

| | | | |
|---|---|---|---|
| JP | 7-4951 U | | 1/1995 |
| JP | 8-247144 A | | 9/1996 |
| JP | 11-201258 A | | 7/1999 |
| JP | 2003-49835 A | | 2/2003 |
| JP | 2003-148628 A | | 5/2003 |
| JP | 2004-84826 A | | 3/2004 |
| JP | 2004-100756 A | | 4/2004 |
| JP | 2004-293313 A | | 10/2004 |
| JP | 2005337001 A | * | 12/2005 |
| WO | 03021133 A1 | | 3/2003 |
| WO | WO 03021133 A1 | * | 3/2003 |
| WO | 03095851 A1 | | 11/2003 |

OTHER PUBLICATIONS

Translation of the International Preliminary Report on Patentability of International Application No. PCT/JP2005/019769 international filing date Oct. 27, 2005 with Forms PCT/IPEA/409.

Chinese Office Action dated Jun. 20, 2008, issued in corresponding Chinese Patent Application No. 200580037570.7.

Japanese Office Action dated Jun. 28, 2011, issued in corresponding Japanese Patent Application No. 2006-543241, with partial English translation.

Extended European Search Report mailed Jun. 25, 2012, issued in corresponding European Patent Application 05799347.9.

* cited by examiner

(A)　　　　　　　　　　CROSS SECTION X-X
　　　　　　　　　　　　　　(B)

FIG.11

THE NUMBER OF REVOLUTIONS OF SCREW SHAFT 1000min−1

FIG.12

SCREW DEVICE WITH SOUND INSULATING MEMBER

The present specification is based on Japanese Patent Application No. 2004-316586 filed on Oct. 29, 2004, entire content of which is expressly incorporated by reference herein.

TECHNICAL FIELD

The present invention relates to a screw device in which rolling elements are disposed to allow rolling motions between a screw shaft and a nut.

BACKGROUND ART

A ball screw in which balls are capable of rolling between a screw shaft and a nut enables a reduction in coefficient of friction in rotating the screw shaft with respect to the nut, as compared with a screw coming into sliding contact. Hence, the ball screw has been utilized in various fields such as a positioning mechanism of a machine tool, feeding mechanism, steering gear of an automobile, and other fields.

Nuts of ball screws are classified into various types such as a return-pipe type, deflector type, and end-cap type, according to how balls are made to circulate. The return-pipe type of nut, which is most commonly used, uses a return pipe for circulating balls. In this nut, the balls are scooped from a nut shaft by the return pipe, pass inside the return pipe, and return to an original position to circulate. The deflector type of nut is compact in size. In this nut, the balls are changed in proceeding direction by a deflector, climb over an outer circumferential surface of a screw shaft, and return to an original position to circulate. The end-cap type of nut is a nut suitable for high-speed feeding. Specifically, the balls are scooped by an end-cap, pass through a through hole of the nut, and return to an original position to circulate. The end-cap type of ball screw is disclosed in the following Patent Document 1. Patent Document 1: International Publication WO2003/021133

DISCLOSURE OF INVENTION

Problems to be Solved by the Invention

However, in these nuts of ball screws, there is a case that sounds arise when balls circulate inside the nut. As a conventional sound insulation technique for ball screws, for example, such a technique is known that retainers are provided between balls to prevent the balls from coming into contact with one another.

A turning portion to change the direction of balls is provided in a circulation path along which the balls circulate. The ball comes into contact with the wall surface of the turning portion, thereby making a sound. When retainers are provided between balls, it is possible to prevent the balls from coming into contact with one another. However, it is not possible to reduce sounds made by the balls coming into contact with the turning portion, so that the retainers result in insufficient solution for sound insulation. Particularly, in the return-pipe type of nut, the return pipe where the turning portion is formed is exposed to the outside, whereby a sound tends to occur from the exposed return pipe. Further, also in the deflector type of nut, the deflector where the turn portion is formed is exposed to the outside, so that the same case arises too.

Therefore, it is an object of the invention to provide a screw device enabling insulation of sounds occurring from inside the screw device.

Means for Solving the Problem

The present invention will now be described below. In the followings, reference numerals in the accompanying drawings are added in brackets for ease in understanding the present invention, but the present invention is not thereby limited to embodiments as shown in the drawings.

To solve the above-mentioned problems, a screw device according to a first aspect of the invention is characterized by comprising a screw shaft (1) having a spiral rolling-element rolling groove (1a) on an outer circumferential surface; a nut body (2) having a spiral loaded rolling-element rolling groove (2a) on an inner circumferential surface to oppose the rolling-element rolling groove (1a) of the screw shaft (1) and having therein a rolling-element returning passage (6) to return rolling elements (3) rolling in a loaded rolling-element rolling passage (10) formed between the rolling-element rolling groove (1a) of the screw shaft (1) and the loaded rolling-element rolling groove (2a); a circulation member (9) attached to an end face of the nut body (2) and provided with a direction changing passage (5) to connect the loaded rolling-element rolling passage (10) and the rolling-element returning passage (6); and a sound insulating member (11) attached to either the nut body (2) to which the circulation member (9) is attached or the circulation member (9) and formed to have an inner circumferential surface coming into contact with the screw shaft (1) and to cover the circulation member (9).

A second aspect of the invention is characterized in that in the screw device of claim 1, the sound insulating member (11) is made of a self-lubricating material impregnated with a lubricant.

A third aspect of the invention is characterized in that in the screw device of claim 1 or 2, the sound insulating member (11) is attached so as to come into contact with the circulation member (9).

A fourth aspect of the invention is characterized in that, in the screw device of any one of claims 1 to 3, the screw device further comprises a cap member (13) attached, by way of the sound insulating member (11) to the nut body (2) to which the circulation member (9) is attached and formed to have a through hole (13a) through which the screw shaft (1) passes, wherein the cap member (13) is made of a resin with elastomer mixed therein.

A fifth aspect of the invention is characterized in that in the screw device of any one of claims 1 to 4, the circulation member (9) is made of a resin with elastomer mixed therein.

A sixth aspect of the invention is characterized in that in the screw device of any one of claims 1 to 5, a retainer (4) is provided between the rolling elements (3), the rolling elements (3) are made of ceramic, and the screw shaft (1) is formed to have a hollow portion extending in an axial direction thereof, the hollow portion being filled with a ceramic material serving as a vibration absorber (15).

A seventh aspect of the invention is provided as a screw device characterized by comprising a screw shaft (1) having a spiral rolling-element rolling groove (1a) on an outer circumferential surface; a nut body (2) having a spiral loaded rolling-element rolling groove (2a) on an inner circumferential surface to oppose the rolling-element rolling groove (1a) of the screw shaft (1) and having therein a rolling-element returning passage (6) to return rolling elements (3) rolling in a loaded rolling-element rolling passage (10) formed between the rolling-element rolling groove (1a) of the screw shaft (1) and the loaded rolling-element rolling groove (2a); a circulation member (9) attached to an end face of the nut body (2) and provided with a direction changing passage (5) to connect the loaded rolling-element rolling passage (10) and the rolling-element returning passage (6); and a cap member (13) attached to either the nut body (2) or the circulation member (9) and formed to have a through hole (13a) through which the screw shaft (1) passes, wherein the cap member (13) is made of a resin with elastomer mixed therein.

An eighth aspect of the invention is provided as a screw device characterized by comprising a screw shaft (1) having a spiral rolling-element rolling groove (1a) on an outer circumferential surface; a nut body (2) having a spiral loaded rolling-element rolling groove (2a) on an inner circumferential surface to oppose the rolling-element rolling groove (1a) of the screw shaft (1) and having therein a rolling-element returning passage (6) to return rolling elements (3) rolling in a loaded rolling-element rolling passage (10) formed between the rolling-element rolling groove (1a) of the screw shaft (1) and the loaded rolling-element rolling groove (2a); and a circulation member (9) attached to an end face of the nut body (2) and provided with a direction changing passage (5) to connect the loaded rolling-element rolling passage (10) and the rolling-element returning passage (6), wherein the circulation member (9) is made of a resin with elastomer mixed therein.

Advantageous Effect of the Invention

According to a first aspect of the invention, the nut, which is known as an end-cap type nut, is adopted, in which the circulation member and the rolling-element retuning passage are hardly exposed to the outside, and the circulation member is covered with the sound insulating member. Thus it is possible to effectively insulate sounds occurring in the direction changing passage (turning portion) of the circulation member, whereby obtain a screw device with low noise is provided. In addition, the sound insulating member is brought into contact with the screw shaft. Hence the sounds do not leak to the outside from between the sound insulating member and the screw shaft.

According to a second aspect of the invention, when the sound insulating member comes into contact with the screw shaft, the sound insulating member, which is made of the self-lubricating material, is able to slide smoothly along the screw shaft.

According to a third aspect of the invention, bringing the sound insulating member into contact with the circulation member makes it possible to further reduce sounds occurring from the circulation member.

According to a fourth aspect of the invention, the cap member made of the resin with the elastomer mixed therein absorbs sounds. Hence it is possible to further reduce the sounds occurring from the screw device.

According to a fifth aspect of the invention, the circulation member, with which the rolling elements come into contact, is produced using the resin with the elastomer mixed therein. Hence it is possible to reduce sounds occurring from the circulation member when the rolling elements come into contact with the circulation member.

According to a sixth aspect of the invention, the rolling member is made of ceramic, so that it is possible to reduce sounds occurring from the rolling member. In addition, by providing a retainer between rolling elements, it is possible to prevent the rolling elements from coming into contact with one another. Further, by loading the screw shaft with the ceramic material, it is possible to reduce sounds occurring from the screw shaft. Accordingly, a screw device with low noise can be obtained.

According to a seventh aspect of the invention, the cap member, made of the resin with the elastomer mixed therein, reduces sounds occurring from the screw device.

According to an eighth aspect of the invention, the circulation member, with which the rolling elements come into contact, is produced using the resin with the elastomer mixed therein. It is thereby possible to reduce sounds occurring from the circulation member when the rolling elements come into contact therewith.

BRIEF DESCRIPTION OF REFERENCES

1a . . . Ball rolling groove (rolling-element rolling groove)
1 . . . Screw shaft
2 . . . Nut body
2b . . . End face
2a . . . Loaded ball rolling groove (Loaded rolling-element rolling groove)
3 . . . Ball (rolling member)

4 ... Retainer
5 ... Direction changing passage
6 ... Ball returning passage
8 ... Concave portion
9 ... Circulation member
10 ... Loaded ball rolling groove (Loaded rolling-element rolling passage)
11 ... Sound insulating member
13 ... Cap member
13a ... Through hole
14 ... Screw shaft body
15 ... Vibration absorber

BEST MODE FOR CARRYING OUT THE INVENTION

Figure 1:
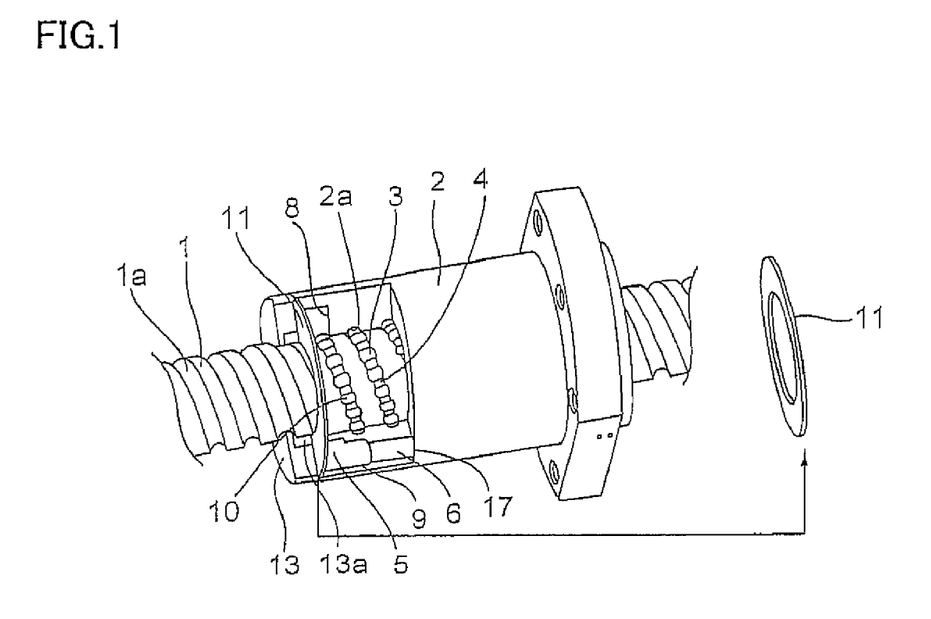
FIG. 1 is a perspective view of a ball screw adopted in an embodiment of the present invention.

FIG. 1 shows a perspective view of a ball screw serving as a screw device adopted in one embodiment of the present invention. The ball screw is provided with a screw shaft 1 having a ball rolling groove 1a serving as a spiral rolling-element rolling groove on an outer circumferential surface, and a nut body 2 having a loaded ball rolling groove 2a serving as a spiral loaded rolling-element rolling groove opposed to the ball rolling groove 1a on an inner circumferential surface. A plurality of balls 3, which serve as rolling elements, are arranged between the ball rolling groove 1a of the screw shaft 1 and the loaded ball rolling groove 2a of the nut body 2. There are provided retainers 4 that prevent the balls 3 from coming into contact with one another between balls 3.

When the nut body 2 is relatively rotated to the screw shaft 1, the plurality of balls 3 roll along a loaded ball rolling groove 10 formed between the ball rolling groove 1a and the loaded ball rolling groove 2a. The balls 3 that have rolled to one end of the loaded ball rolling groove 10 are scooped by a direction changing passage 5, and returned to an original position through a ball returning passage 6 serving as a rolling-element retuning passage.

Inside the nut body 2, there is formed a through hole 17 extending in parallel with the axial line of the nut body 2. A pipe member (not shown) is inserted into the through hole 17, and the ball returning passage 6 extending in the axial direction is formed inside the pipe member.

Figure 3:
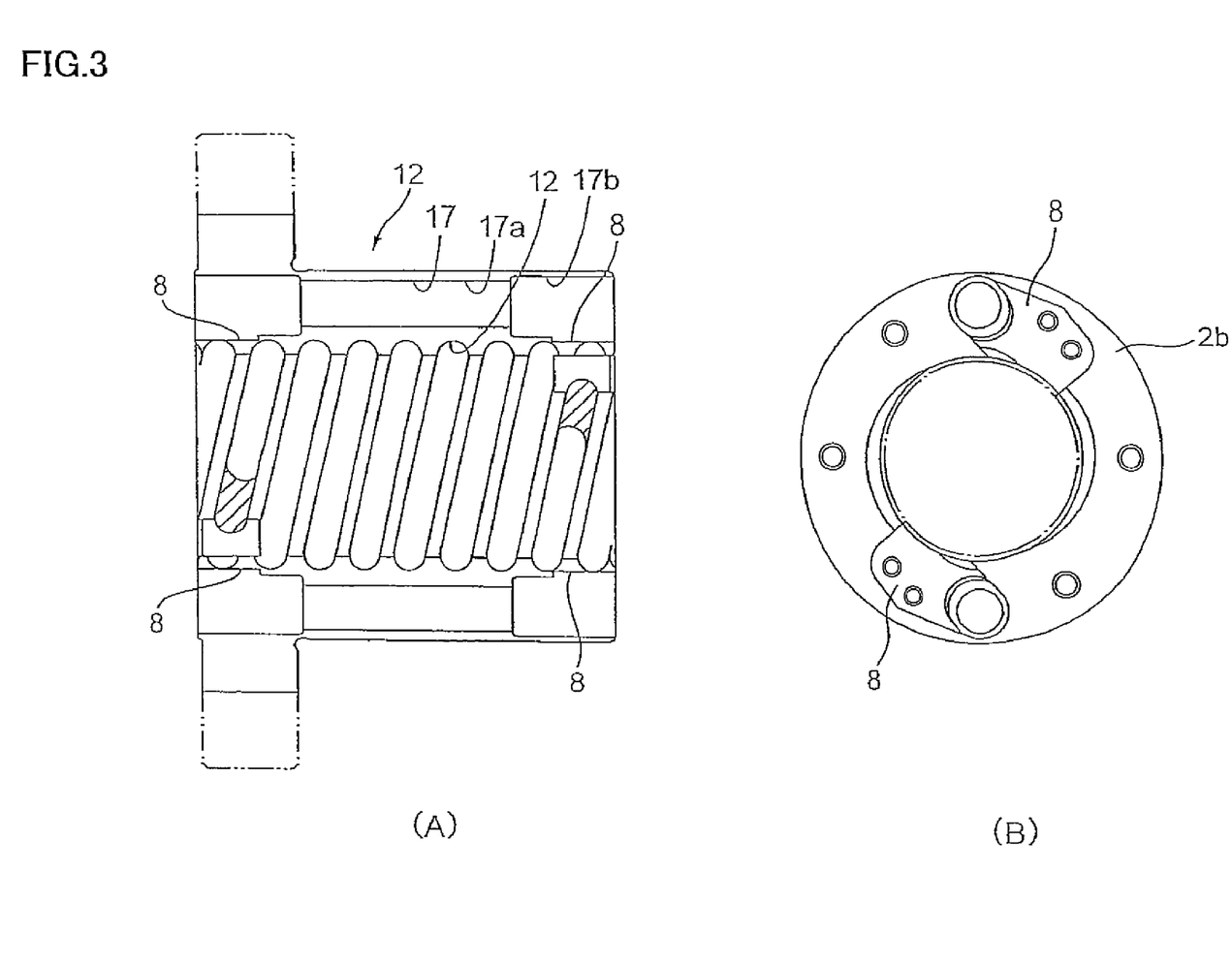
FIGS. 3(A) and 3(B) are views each showing a nut body (FIG. 3(A) shows a cross-sectional view along the axial direction of the nut body and FIG. 3(B) shows the front view of the nut body which is viewed in the axial direction of the nut body)

Concave portions 8 (also shown in FIGS. 3(A) and 3(B)) are formed at both end faces of the nut body 2 in the axial direction thereof, and circulation members 9 forming the direction changing passage 5 are attached to the concave portions 8, respectively. The direction changing passage 5 has an arc-shaped track to connect the loaded ball rolling groove and the ball returning passage 6. The circulation member 9 scoops the ball 3 rolling along the ball rolling groove 1a of the screw shaft 1, passes the ball 3 through the direction changing passage 5, and guides the ball 3 to the ball returning passage 6. The circulation member 9 is secured to the end faces of the nut body 2 using fastening means such as bolts or other members.

To each of the end faces of the nut body 2, there is attached a sound insulating member 11 that covers the circulation member 9, in which the sound insulating member 11 has an inner circumferential surface whose overall area comes into contact with the screw shaft 1. The sound insulating member 11 comes into intimate contact with each end face 2b of the nut body 2 and the circulation member 9. The outside shape of the sound insulating member 11 is substantially the same as the outside shape of the nut body 2.

A cap member 13 is attached to the nut body 2 in a condition where the sound insulating member 11 is held between the member 13 and the nut body 2. The cap member 13 has a hole through which the screw shaft 1 is passed, and does not come into contact with the screw shaft 1. A labyrinth seal or wiper ring (ring-shaped sealing member) is inserted into a space portion 13c between the cap member 13 and the sound insulating member 11 to not only remove foreign substance therefrom but also prevent a lubricant from leaking from inside the nut body 2.

In the present embodiment, the nut referred to as the end-cap type is adopted, in which the circulation member 9 and the rolling-element retuning passage 6 both are not exposed to the outside. Hence, from an original viewpoint, the sound is hard to occur from the nut itself, when compared with the return-pipe type of nut and the deflector type of nut. In addition, since the circulation member 9 is covered by the sound insulating member 11, it is possible to effectively insulate sounds occurring from the direction changing passage 5 of the circulation member 9. Furthermore, since the sound insulating member 11 is brought into contact with the screw shaft 1, sounds generated between the sound insulating member 11 and the screw shaft 1 does not leak to the outside.

The screw shaft 1, nut body 2, circulation member 9, sound insulating member 11, and cap member 13 will now be detailed more in turns.

Figure 2:
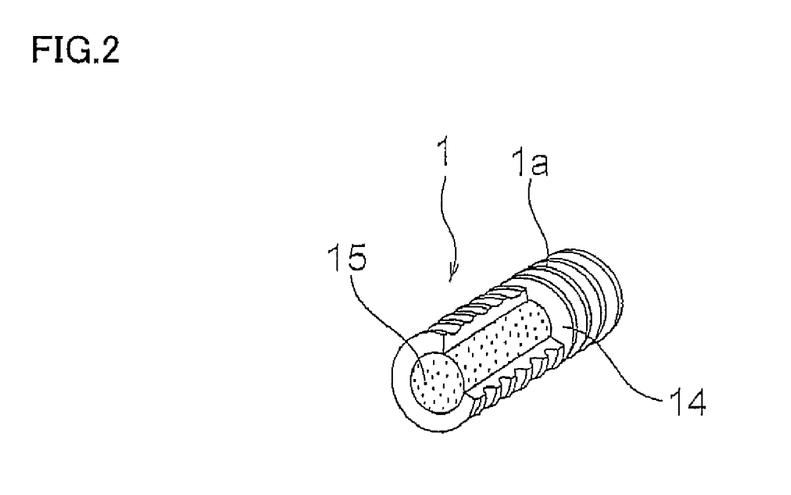
FIG. 2 is a perspective view of a screw shaft.

FIG. 2 shows the screw shaft 1. The spiral ball rolling groove 1a having a predetermined lead is formed on the outer circumferential surface periphery of the screw shaft 1. In the present embodiment, in order to increase an allowable load and shorten the entire length of the nut body 2, the number of threads that compose the ball rolling groove 1a is set to two. Further, according to the two treads of the ball rolling groove, the circulation member 9 and the pipe member 2, which are described above, are provided by two, respectively. Of course, the number of threads of the ball rolling groove 1a may be set to other values such as one, two, three, or more.

The screw shaft 1 is provided with a screw shaft body 14 made of metal and provided with a hollow portion and a ceramic material portion serving as a vibration absorber 15 which fills up the hollow portion without any space. The vibration absorber 15 is loaded into the hollow portion of the screw shaft body 14 in a state of powder, particles or liquid, so that the loaded material is formed inside the hollow portion according to the shape of the hollow portion.

In the present embodiment, a hydraulic compound (Trade-Name: Z-ma, SUMITOMO OSAKA Cement Co., LTD.) having hydraulic powder and non-hydraulic powder as main ingredients is loaded into the hollow portion of the screw shaft body 14 by pressuring, and hydrothermal synthesis is performed on the compound to allow the vibration absorber 15, made of the ceramic material, and the screw shaft body 14 to be integrated to each other. In the present embodiment, the hydraulic powder is defined as powder to be cured by water. By was of example, the hydraulic powder include calcium silicate compound powder, calcium aluminate compound powder, calcium fluoro-aluminate compound powder, calcium sulfur-aluminate compound powder, calcium alumino-ferrite compound powder, calcium phosphate compound powder, hemihydrate or anhydrous gypsum powder, anhydrous lime with self-setting, and powder mixtures of two or more of the aforementioned powder. For example, as a representative of this powder, powder such as Portland cement can be listed.

Further, the non-hydraulic powder, which is defined as powder not to be cured when the powder alone comes into contact with water, includes a kind of powder that is capable of eluting an ingredient thereof when the powder is in an alkaline or acidic condition, or in an atmosphere of highpressure steam, and reacting with another eluted ingredient to form a product. By using such a non-hydraulic powder as an additive, the filling rate of a compact to be formed can be increased, thus reducing the percentage of void of the formed compact, thus leading to an improvement in the dimensional stability of the formed compact. For example, representatives of this non-hydraulic powder are calcium hydroxide powder, dehydrate gypsum powder, calcium carbonate powder, slag powder, fly ash, silica powder, clay powder, silica fume powder, and the others.

Thus, filling the screw shaft 1 with the ceramic material makes it possible to reduce the sound occurring from the screw shaft 1.

FIGS. 3(A) and 3(B) show the nut body 2. FIG. 3(A) shows a cross-sectional view along the axial direction of the nut body 2, while FIG. 3(B) shows a front view of the nut body 2 as being viewed in the axial direction of the nut body 2. The spiral loaded ball rolling groove 2a, which is opposed to the ball rolling groove 1a of the screw shaft 1, is formed on the inner circumferential surface of the nut body 2. Further, through the nut body 2, the through hole 17 is formed to extend in parallel with the axial direction of the nut body 2. In the through hole 17, a center portion 17a is formed to have a small diameter, while both end portions 17b on both sides of the center portion are formed to have a diameter slightly larger than that of the center portion 17a. The pipe member is inserted into the center portion 17a of the through hole 17, and the circulation member 9 is inserted into both end portions 17b. The concave portions 8, which allow the circulation member 9 to be attached to the nut body 2, are formed at the end faces of the nut body 2 in the axial direction thereof. The numbers of pairs consisting of the pipe member and circulation member 9 is the same as the number of threads of the ball rolling groove 1a (two pairs in the present embodiment), so that the balls 3 which has rolled along each of the two treads of the ball rolling groove 1a can be circulated.

Figure 4:
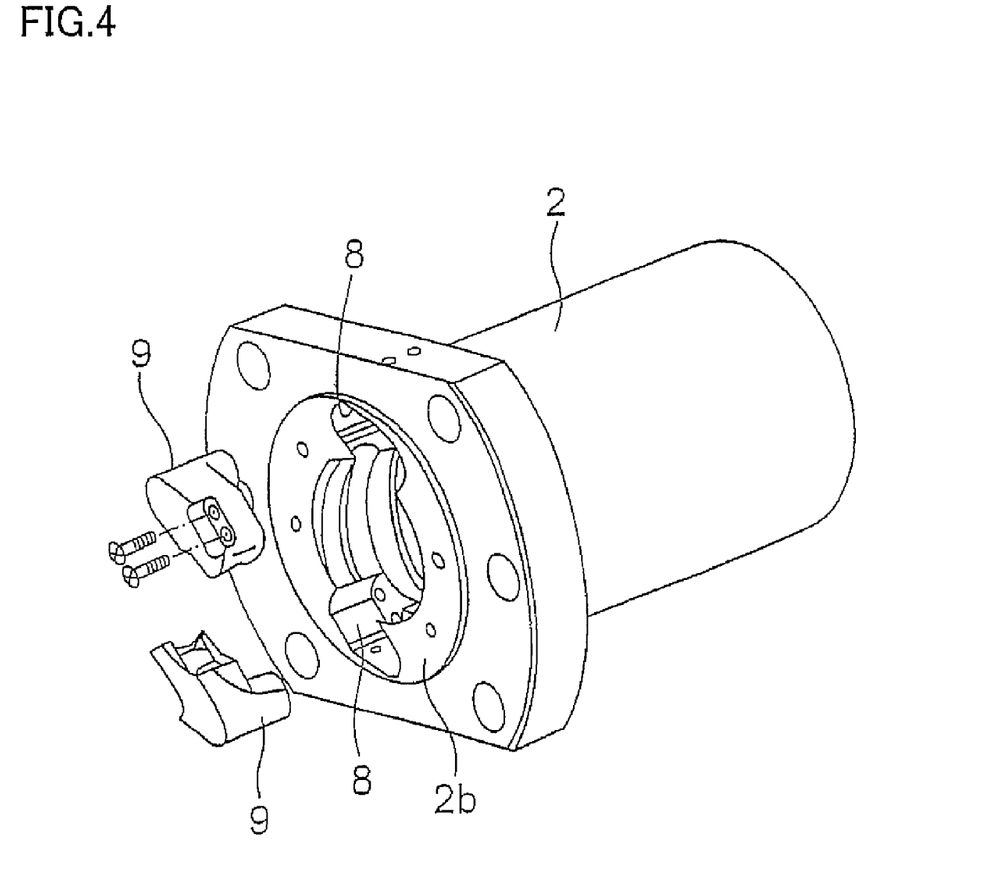
FIG. 4 is a perspective view showing the nut body and a circulation member.

FIG. 4 shows a perspective view of the nut body 2 and the circulation member 9. As described above, the concave portions 8 are formed in each end face 2b of the nut 2, in which the circulation member 9 is attached to the concave portions 8.

Figure 5:
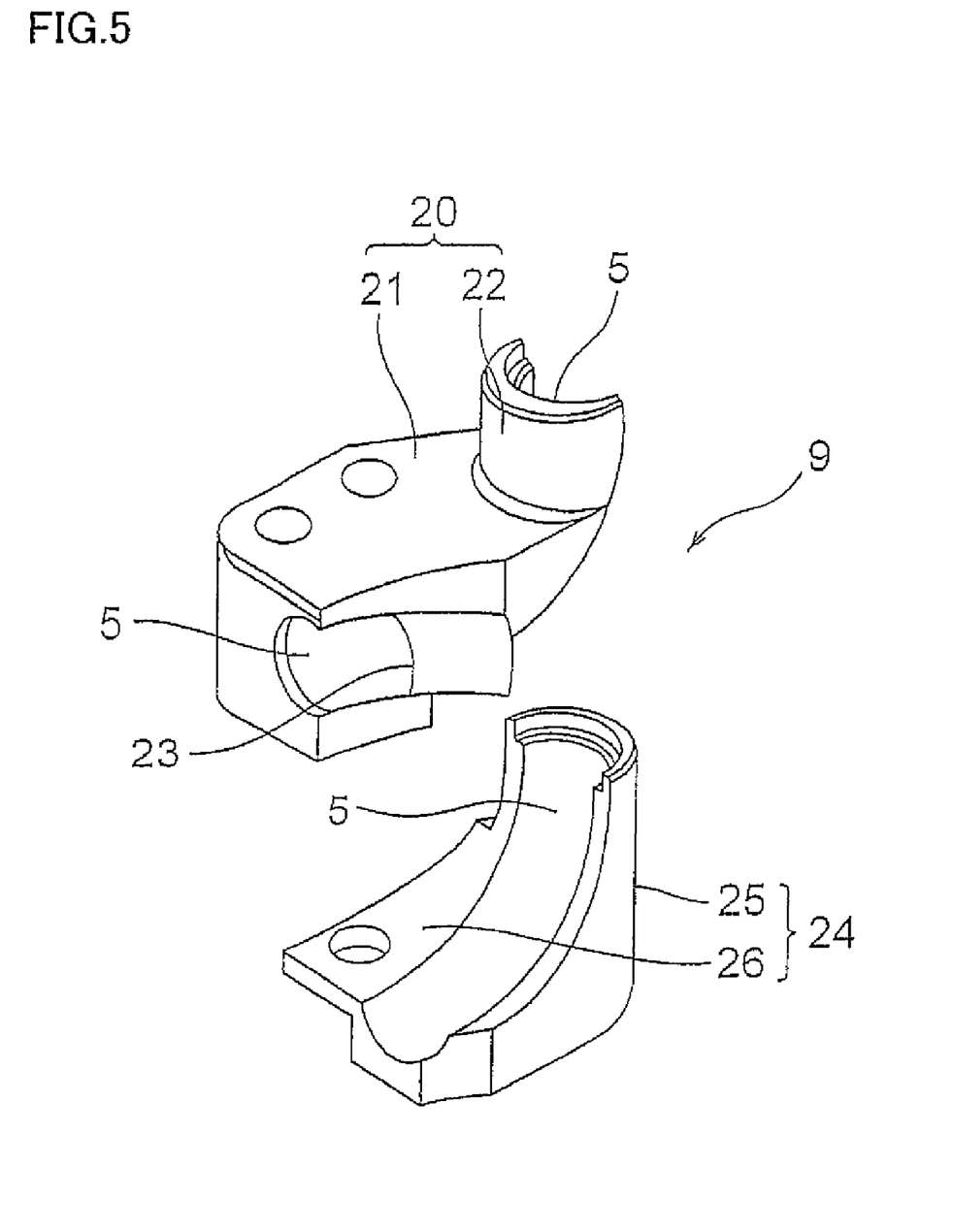
FIG. 5 is a view showing in detail the circulation member (state in which an inner circumferential side part and an outer circumferential side part of the circulation member are separated)
Figure 6:
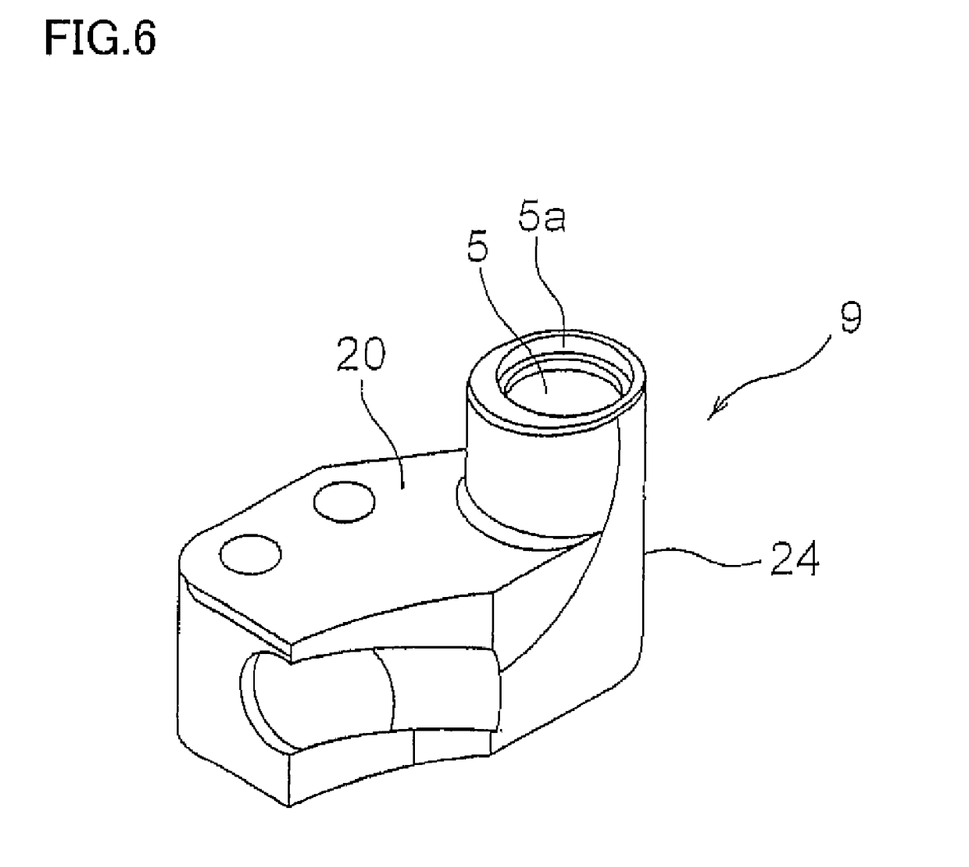
FIG. 6 is a view showing in detail the circulation member (state in which an inner circumferential side part and an outer circumferential side part of the circulation member are combined with each other)

FIGS. 5 and 6 show detailed structures of the circulation member 9. The circulation member 9 is divided into two parts at the center of the direction changing passage 5, the two parts consisting of an inner periphery-side part 20 and an outer periphery-side part 24. The inner periphery-side part 20 of the circulation member 9 has a main body portion 22 in which is formed the direction changing passage 5 of which section is semicircular and a fringe portion 21 to be attached to each of the end faces of the nut body 2. In the main body portion 22, there is formed a scooping portion 23 that scoops the balls 3 from the loaded ball rolling groove 10. The scooping portion 23 is formed to protrude toward the ball rolling groove 1a of the screw shaft 1, thereby securing the strength of the scooping portion 23. The scooping portion 23 scoops the balls 3 that has rolled along the spiral loaded ball rolling groove 10 in a tangential direction of the rolling groove 10.

The outer periphery side 24 of the circulation member 9 has a main body portion 25 in which there is formed the direction changing passage 5 of which cross section is semicircular and a fringe portion 26. By mutually combining the inner periphery-side part 20 and the outer periphery-side part 24 of the circulation member 9, the direction changing passage 5 of which cross section is circular is formed. The direction changing passage 5 has an arc-shaped track. The balls 3, which have scooped up in the tangential direction of the loaded ball rolling groove 10 by the scooping portion 23, are subjected to changing directions by the direction changing passage 5, and then move along the arc-shaped track. One end 5a of the direction changing passage 5 is connected to the pipe member forming the non-loaded ball returning passage 6.

Figure 7:
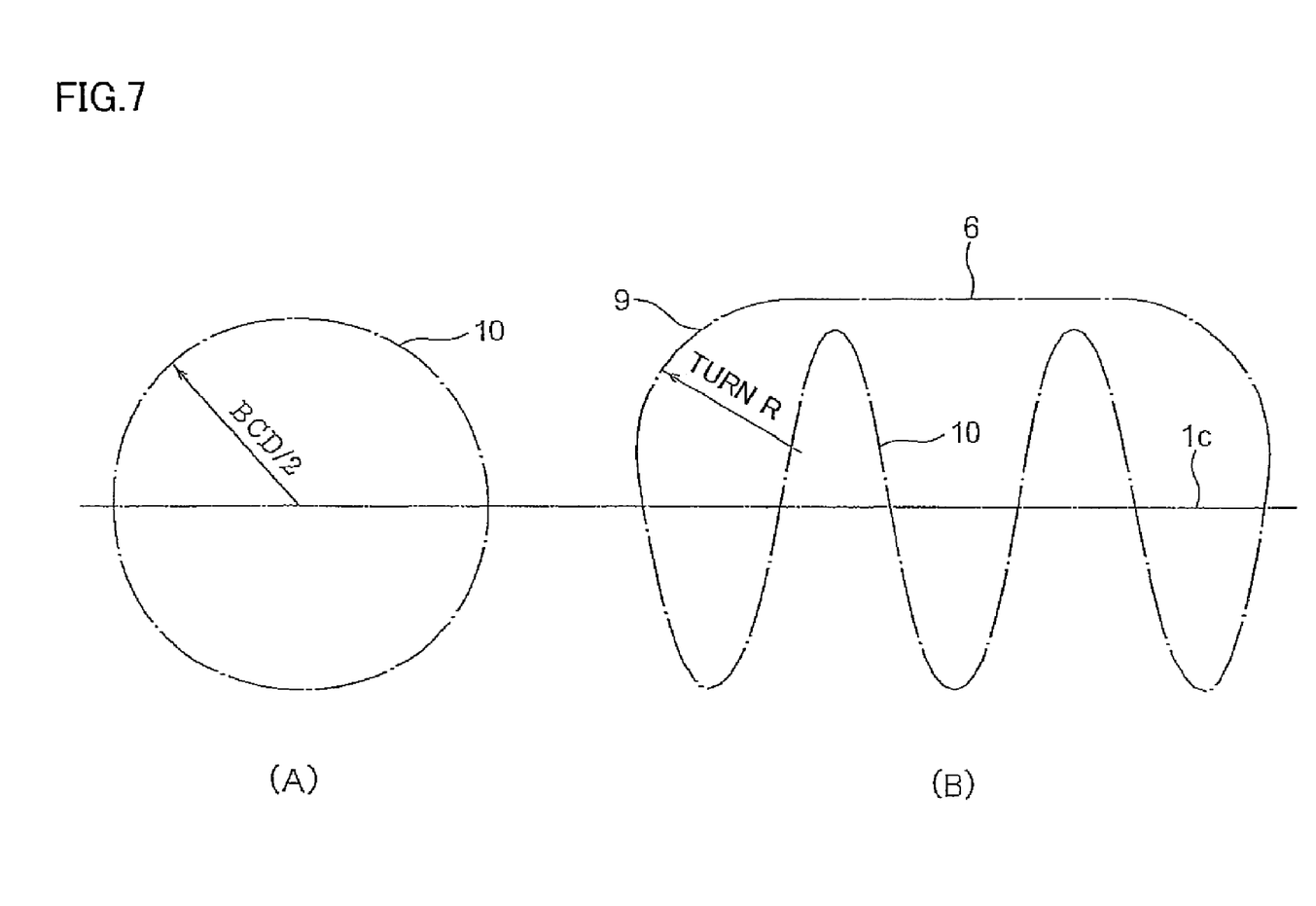
FIGS. 7(A) and 7(B) are views each showing a track of a ball circulating in a loaded ball rolling groove, an arc-shaped direction changing passage, and a linear ball returning passage (FIG. 7(A) shows a track of the ball moving in the loaded ball rolling groove (when viewed in the axial direction of the screw shaft), and FIG. 7(B) shows a track of the ball circulating in the overall infinite circulation passage (when viewed in a lateral direction of the screw shaft))

FIGS. 7(A) and 7(B) show the track of each ball 3 circulating along the spiral loaded ball rolling groove 10, the arc-shaped direction changing passage 5, and the linear ball returning passage 6. FIG. 7(A) shows the track of each ball 3 moving along the loaded ball rolling groove 10 (when it is viewed in the axial direction of the screw shaft 1), whilst FIG. 7(B) shows the track of each ball 3 circulating along the overall infinite circulation passage (when it is viewed in a lateral direction of the screw shaft 1). The track of the balls 3 along the loaded ball rolling passage 10 is depicted a spiral shape having a radius of BCD/2. The track of the ball 3 along the ball returning passage 6 is depicted as a straight line which is parallel with a line 1c in the axial direction of the screw shaft 1. Further, the track of the ball 3 along the direction changing passage 5 is depicted as an arch having a curvature radius of R. The loaded ball rolling groove 10, the direction changing passages 5, and non-loaded returning passage 6 are mutually jointed to show jointed portions which are continuous in the tangential directions to the track of the ball 3. Thus the track is made smooth at its respective joints.

The circulation member 9 is made of a resin with which elastomer is mixed. The circulation member 9 is manufactured by mixing pellets of the elastomer and pellets of the resin such as Nylon, melting the pellets, and performing injection molding.

The circulation member 9 is subjected to scooping the balls 3 and changing the directions of the balls 3, so that the sound caused by contact of the balls 3 with the circulation member 9 tends to be large. In the present embodiment, the circulation member 9 coming into contact with the balls 3 is manufactured with a resin with elastomer mixed therein, with the result that it is possible to reduce the sound occurring from the circulation member 9 when the balls 3 and the circulation member 9 come into contact with each other.

Figure 8:
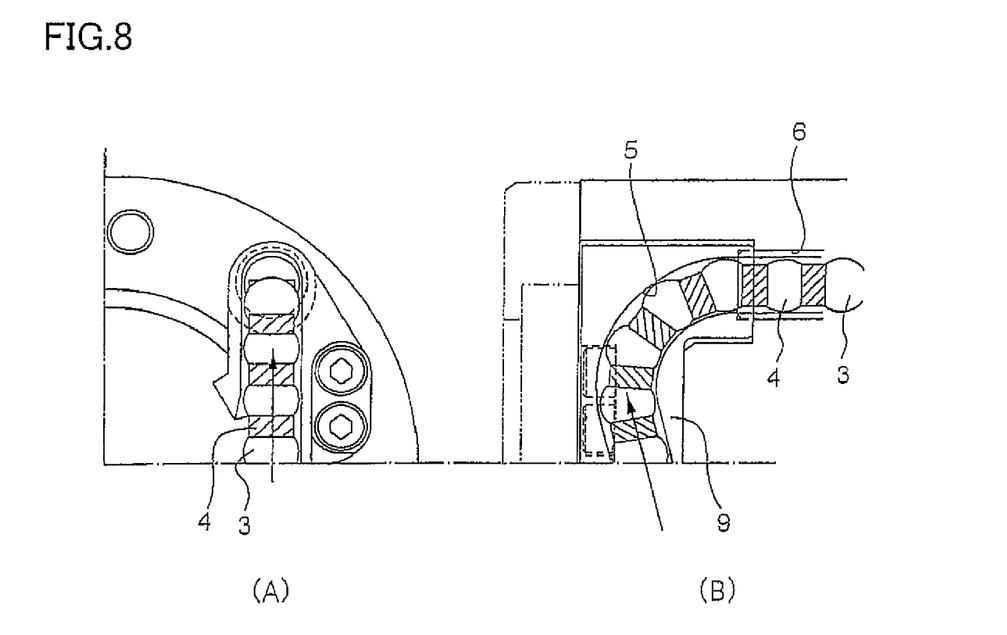
FIGS. 8(A) and 8(B) are views each showing the direction of scooping the ball (FIG. 8(A) shows a state when the direction is viewed in the axial direction of the screw shaft and FIG. 8(B) shows a state when the direction is viewed in a lateral direction of the screw shaft)

FIGS. 8(A) and 8(B) show the direction in which the balls 3 are scooped. When the device is viewed in the axial direction of the screw shaft 1, the balls 3 are scooped in the tangential direction of the circular track of the loaded ball rolling groove 10, as shown in FIG. 8(A). In addition, when the device is viewed in a lateral direction of the screw shaft, the balls 3 are scooped in the direction which is in accordance with the lead angle, as shown in FIG. 8(B).

Figure 9:
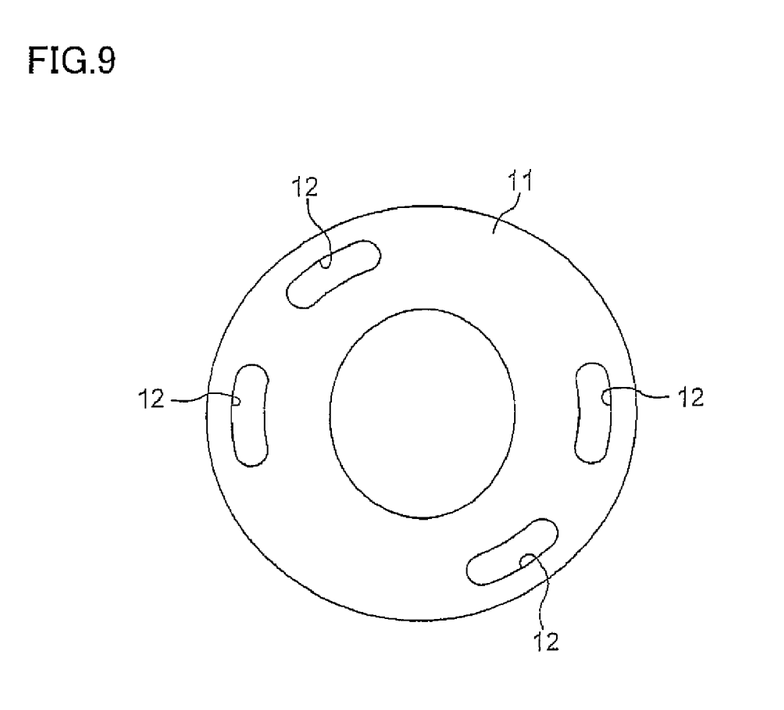
FIG. 9 is a front view showing a sound insulating member.

FIG. 9 shows the sound insulating member 11. The sound insulating member 11 is formed in the shape of a thin disk. The cross sections perpendicular to the axial direction of the screw shaft 1 are not a perfect circle, but are shaped into an odd-form circle. Additionally, those cross sections which are positionally different in the axial direction of the screw shaft have the same cross-sectional shape. In a central portion of the sound insulating member 11, there is formed a hole that is not a perfect circle but shaped into an odd-form circle which agrees with the shape of cross sections of the screw shaft 1, in which the cross sections are perpendicular to the axial direction of the screw shaft 1. This enables the inner periphery of the sound insulating member 11 to tightly contact the outer periphery of the screw shaft 1. When the sound insulating member 11 is moved in the axial direction of the screw shaft 1, the sound insulating member 11 rotates around the screw shaft 1. To reliably bring the sound insulating member 11 into intimate contact with the nut body 2, the sound insulating member 11 is provided with long holes 12 extending in the circumferential direction of the member 11. The sound insulating member 13 is mounted to the nut body 2 by using mounting screws, which are screwed through the long holes 12.

By the way, in the present embodiment, the inner diameter of the sound insulating member 11 is made to exactly agree with the shape of the right-angle cross sections of the screw shaft 1 so that there is no gap therebetween. However this is just an example. As long as the object of insulating the sound can be achieved, a slight space may be left between the sound insulating member 11 and screw shaft 1 by giving allowable tolerance with processing the device.

The sound insulating member 11 is made of a self-lubricating material impregnated with a lubricant. The self-lubricating material includes LaCS (Trademark of THK Co., LTD.) obtained by impregnating a fiber-shaped member with a lubricant, oil impregnation rubber (for example, oil impregnation HNB) obtained by impregnating a rubber with a lubricant in curing the rubber and concurrently forming the lubricant and rubber, and oil impregnation felt obtained by impregnating a felt with a lubricant. A contact face between the sound insulating member 11 and the screw shaft 1 is supplied with the lubricant owned by the sound insulating member 11 itself. Further, to absorb the sound, the sound insulating member 11 is made of a soft material. The thickness of the sound insulating member 11 is set to, for example, 1.5 mm or less under constraints resulting from installation spaces. Further, from the viewpoint of rigidity, the thickness of the sound insulating member 11 is set to 1 mm or more when the LaCS or the oil impregnation felt is employed, and the thickness is set to 0.3 mm or more when the oil impregnation rubber is employed.

Figure 10:
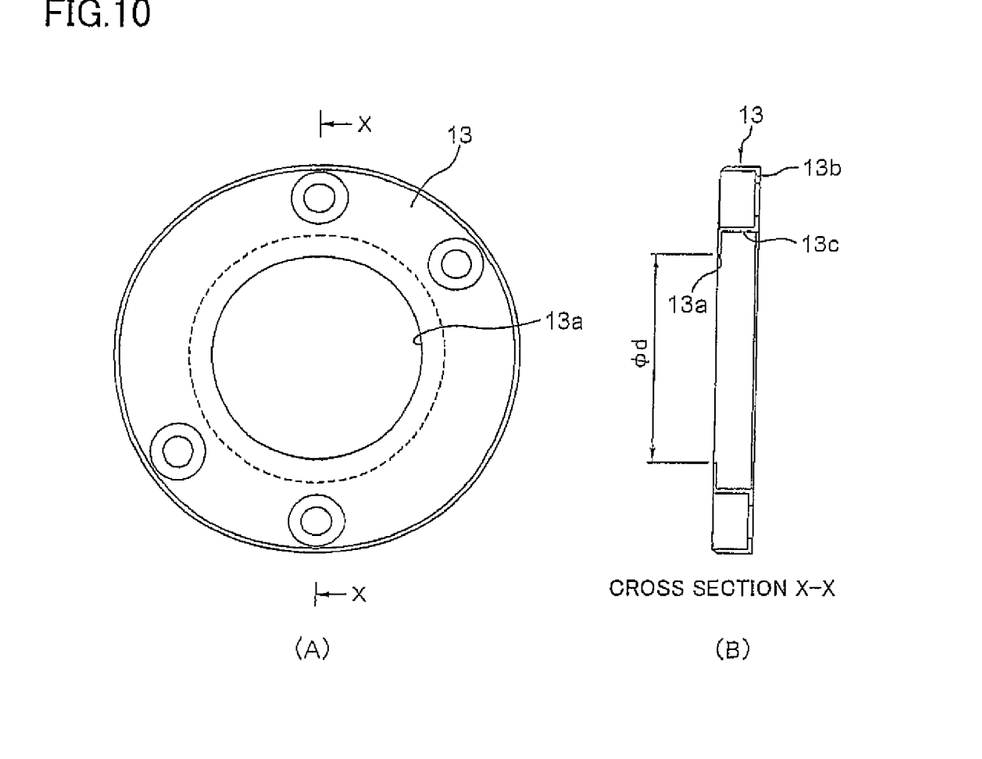
FIGS. 10(A) and 10(B) are views each showing a cap member (FIG. 10(A) shows a front view thereof and FIG. 10(B) shows a cross-sectional view taken along a X-X line of FIG. 10(A))

FIGS. 10(A) and 10(B) show the cap member 13. This cap member 13 has a through hole 13a formed as shown therein, through which the screw shaft is made to pass. The inner diameter φd of the through hole 13a is larger than the outer radial shape of the screw shaft 1, so that a slight gap is left between the cap member 13 and the screw shaft 1. The cap member 13 has an intimate portion 13b coming into intimate contact with the sound insulating member 11 and a seal holding portion 13c. When the cap member 13 is secured to the nut body 2 by fastening means such as a screw or others, the sound insulating member 11 is held between the cap member 11 and the nut body 2.

The cap member 13 is made of a resin with elastomer mixed therein. The cap member 13 is manufactured by mixing pellets of the elastomer and the pellets of the resin such as Nylon, melting those pellets, and performing injection molding.

The cap member 13, which is made of the resin with the elastomer mixed therein, is able to absorb the sound. Hence the sound occurring from the ball screw can be lowered in level.

Further, the balls 3 can be made of ceramic, whereby the sound occurring from the balls 3 can be lowered. In addition, by providing the retainers 4 between the balls 3, the balls 3 can be prevented from coming into contact with each other.

Incidentally, the present invention is not limited to the above-mentioned embodiment, but may be changed into various other modes without departing from the gist of the invention. For example, any one of the sound insulating member, the cap member, and the circulation member may be selected and reduced into practice according to the description made in the foregoing embodiment, because adopting any one of the above three members is still effective for reducing the sound. In such a case, it is sufficient that the remaining members have conventional known structures. Further, in the above-mentioned embodiment, a plurality of circulation members are separate from each other, but may be coupled to a disk-shaped plate of which shape is in accordance with that of the nut body. The rolling members may be rollers, instead of the balls.

EXAMPLES

Figure 11:
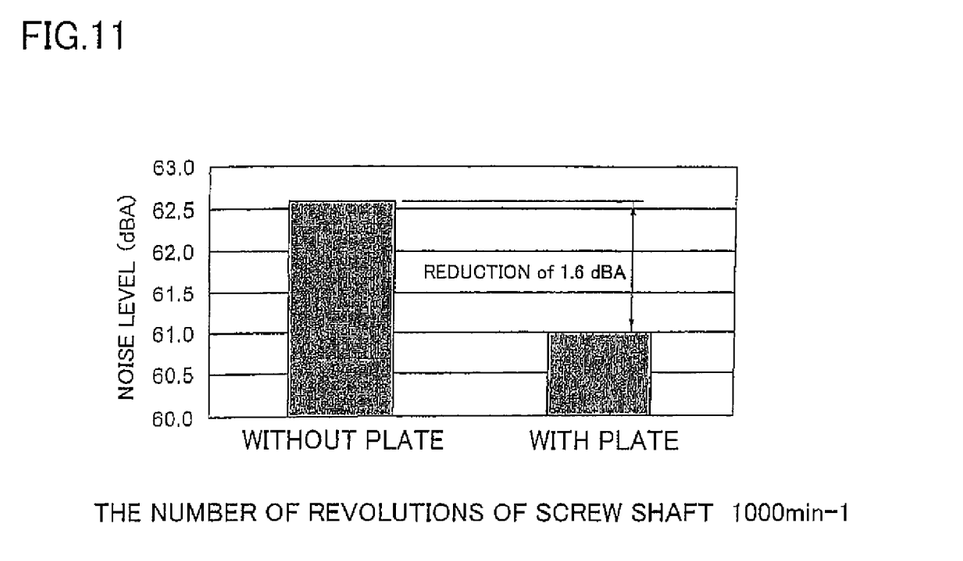
FIG. 11 is a graph showing noise levels in comparison between a case in which the sound insulating member (with a plate) is used and another case in which the sound insulating member (without the plate) is not used.

FIG. 11 is a graph showing comparison in noise levels between a case in which the sound insulating member 11 is provided (with the plate) and another case in which the sound insulating member 11 is not provided (without the plate). The sound insulating member 11 made of oil impregnation rubber was used. At a position one meter apart from a test apparatus for the ball screw, both noise generated when the balls screw was actuated and dark noise which was present when the ball screw was not actuated were measured. And the calculated noise levels from those measurement values were evaluated. It is understood that the noise can be reduced by 1.6 dBA when the sound insulating member 11 is provided.

Figure 12:
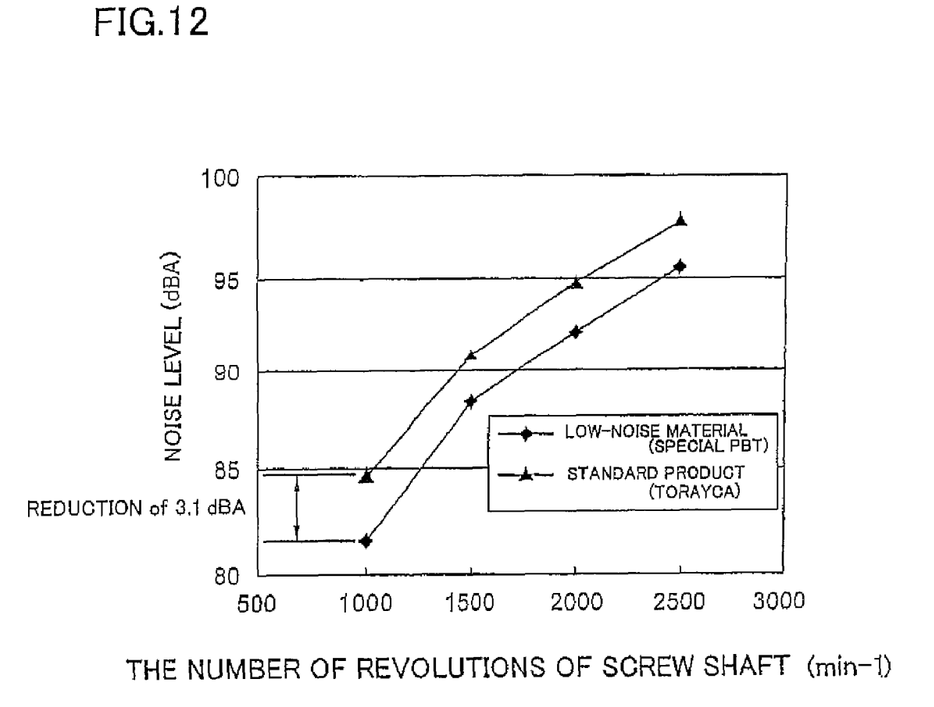
FIG. 12 is a graph showing noise levels in comparison between a case in which a standard product (TORAYCA: Trademark of Toray Industries, Inc.) is used as a cap member and another case in which a low-noise material (resin with elastomer mixed therein) is used for the cap member.

FIG. 12 is a graph showing comparison in noise levels between a case in which the cap member 13 is a standard product (TORAYCA: Trademark of Toray Industries, Inc.) and another case in which the cap member 13 is made by using a low-noise material (resin with the elastomer mixed therein). In the measurement for this graph, the sound insulating member was not used in both cases. It is understood from the graph that the noise levels can be reduced by 3.1 dBA, provided that the low-noise material is used for the cap member 13.

The invention claimed is:
1. A screw device, comprising:
a screw shaft comprising a spiral rolling-element rolling groove on an outer circumferential surface;
a nut body comprising
a spiral loaded rolling-element rolling groove on an inner circumferential surface to oppose the rolling-element rolling groove of the screw shaft,
a rolling-element returning passage in the nut body, which returns rolling elements rolling in a loaded rolling-element rolling passage formed between the loaded rolling-element rolling groove and the rolling-element rolling groove of the screw shaft, and
a concave portion formed at an end face of the nut body along less than all of an inner peripheral surface of the nut body, the concave portion being connected to the rolling-element returning passage;
a circulation member attached to and inserted into the concave portion and comprising a direction changing passage entirely surrounded by the circulation member in cross-section, the direction changing passage connecting the loaded rolling-element rolling passage and the rolling-element returning passage;
a disk-shaped sound insulating member attached and in direct contact with the end face of the nut body and comprising an inner circumferential surface coming into contact with the screw shaft, the sound insulating member covering the circulation member such that the circulation member is not exposed to the outside, thereby reducing sounds occurring from the circulation member,
a cap member comprising (i) an intimate portion coming into intimate contact with the sound insulating member, and (ii) a seal holding portion, and
a seal member inserted into the seal holding portion so as to remove foreign substances therefrom and to prevent a lubricant from leaking from inside the nut body, wherein the cap member is secured to the nut body by a fastening means so that the sound insulating member is held between the cap member and the nut body, and wherein the sound insulating member has a hole formed therein for inserting the screw.

2. The screw device according to claim 1, wherein the sound insulating member is made of a self-lubricating material impregnated with a lubricant.

3. The screw device according to claim 1 or 2, wherein the sound insulating member contacts the circulation member.

4. The screw device according to claim 1 or 2, wherein the cap member is made of a resin with elastomer mixed therein.

5. The screw device according to claim 1 or 2, wherein the circulation member is made of a resin with elastomer mixed therein.

6. The screw device according to claim 1 or 2, wherein a retainer is provided between the rolling elements, wherein the rolling elements are made of ceramic, and wherein the screw shaft has a hollow portion extending in an axial direction thereof, the hollow portion being filled with a ceramic material serving as a vibration absorber.

\* \* \* \* \*